(No Model.)
E. FALLETTI.
INSTRUMENT FOR MEASURING DISTANCES AND SOLVING TRIGONOMETRICAL PROBLEMS.
No. 504,869. Patented Sept. 12, 1893.
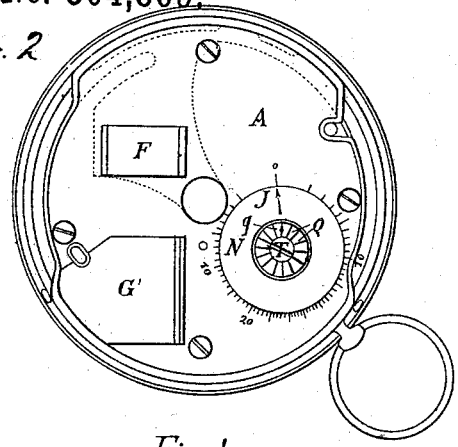
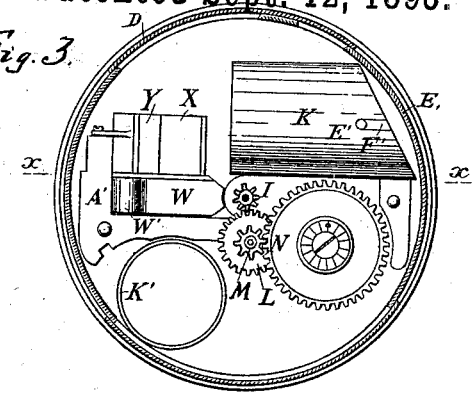
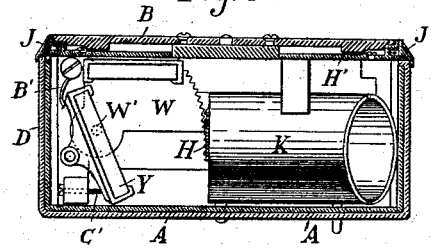
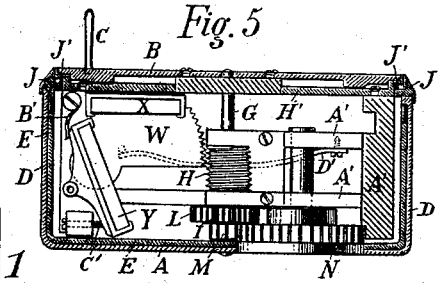
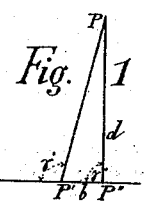
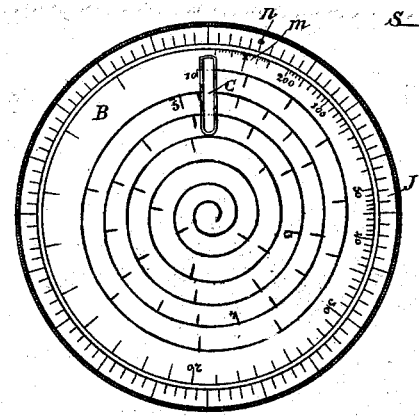
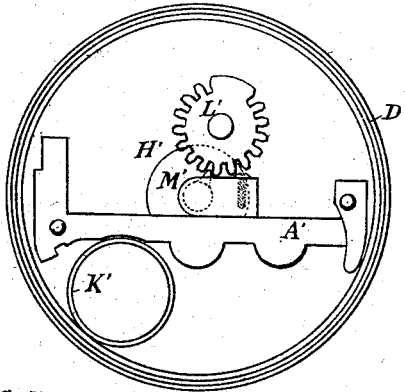
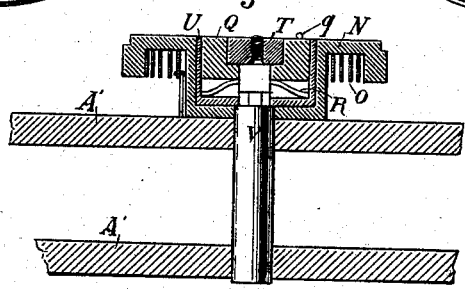
Witnesses:
M. A. Butter
M. C. Pinckney
Inventor.
Eduardo Falletti
by Bowen & Behr attys

UNITED STATES PATENT OFFICE.

EDUARDO FALLETTI, OF ROME, ITALY.

INSTRUMENT FOR MEASURING DISTANCES AND SOLVING TRIGONOMETRICAL PROBLEMS.

SPECIFICATION forming part of Letters Patent No. 504,869, dated September 12, 1893.

Application filed May 12, 1893. Serial No. 473,993. (No model.) Patented in Italy December 23, 1892, No. 33,112.

*To all whom it may concern:*

Be it known that I, EDUARDO FALLETTI, captain of artillery in the Italian Army, a subject of the King of Italy, residing at Rome, Italy, have invented a certain new and useful Instrument for Measuring Distances and Solving Trigonometrical and other Similar Problems, of which the following is a specification.

I have obtained on this invention Letters Patent in Italy, No. 33,112, dated December 23, 1892.

This invention is based upon well known mathematical principles and trigonometrical formulas defining the same as hereinafter explained. Thus in ascertaining the distance between two given points I avail myself of the principle that the sides of any triangle are proportional to the sines of the opposite angles, and that the sum of all the angles in a triangle is always one hundred and eighty degrees.

Figure 1 of the drawings shows a diagram wherein $PP''=d$ represent a distance which is to be ascertained by means of my instrument while $SP''$ represent a line on which a distance $P'P''=b$ has been measured. According to the above rule expressed I have $$\frac{d}{b}=\frac{\sin(180°-\gamma')}{\sin(180°-(\gamma''+180°-\gamma'))}$$

or according to well known elementary trigonometrical principles $$\frac{d}{b}=\frac{\sin\gamma'}{\sin(\gamma'-\gamma'')}$$

or $$d=b\sin\gamma'\frac{1}{\sin(\gamma'-\gamma'')}$$

By means of my device the first factor $=b\sin\gamma'$ is obtained by observations made at the first station $P'$, and the second factor $$=\frac{1}{\sin(\gamma'-\gamma'')}$$

is obtained by such observations at the second station $P''$, the distance $P'P''$ being determined by actual measurement by the operator. In order that the arithmetical operation to be performed, may be very rapid and simple the reading on the instrument at the first station gives in hundredths the complement to unity of the sine of the angle $\gamma'$. Thus assuming $c$ to be the reading obtained on the instrument, we have the equation—

$$c=100(1-\sin\gamma')$$

or $\sin\gamma'=1-\frac{c}{100}$ or $b\sin\gamma'=b-\frac{b}{100}\cdot c$ from which it appears that in order to obtain the first factor sought, it is only necessary to multiply $c$ by the known base $b$, divide by one hundred and subtract the quotient from said base $b$.

In order to obtain the first factor sought $b\sin\gamma'$, it is only necessary to multiply $(c)$ by $(b)$, divide by one hundred, and subtract the quotient from the base $(b)$.

In the drawings, Fig. 1, above referred to represents the triangle to be solved while the other figures illustrate the instrument which is contained in a cylindrical box having one cover fixed and the other revoluble about the axis of the instrument, that is to say: Fig. 2 is a plan view of the instrument looking toward the fixed cover. Fig. 3 is a plan of the mechanism, supposing the fixed cover removed and the cylindrical case in section. Fig. 4 is a cross-section on line $x$—$x$ Fig. 3, looking in the direction of the arrow. Fig. 5 is a similar view, some of the parts being removed. Fig. 6 is a plan of the revolving cover side of the instrument. Fig. 7 is a view similar to Fig. 3, some parts having been removed to show others beneath. Fig. 8 is a detail section of the counter, drawn to double the scale of the other figures.

The same letters of reference indicate the same parts in all the figures.

A is the fixed cover or bottom of the case, B the revolving cover or disk turned by a hinged handle C which folds down when the instrument is not in use.

D is the cylindrical part of the box provided with two sight apertures which are closed as in Fig. 3 when the instrument is not in use, by a sliding shutter E which turns on the center of the bottom A and at same time serves to close the sight aperture F therein, the segment of this sliding shutter which closes said aperture being indicated in Fig. 2 by dotted lines.

At the center of the rotating cover B is fixed the spindle G which carries a worm H and pinion I which gears with wheel L in one with pinion M which gears with wheel N. The wheel N is cupped and contains a spiral spring O attached at one end to the frame A' and at the other to wheel N, the purpose of said spring being to hold the teeth of the gearing in contact even when worn. The face of wheel N is flush with the fixed cover on which are the divisions corresponding to the reading (c) at the first station P' before referred to.

As shown in Fig. 8, at the center of wheel N there is a counter disk Q held by a spring R in engagement with the nut T, the counter disk Q being separated from wheel N by a cup U fitting on a polygonal part of the spindle V which is round, where the wheel N and disk Q turn upon it. The worm H gears with the toothed sector W to which the mirror X is attached, another mirror Y being pivoted to the frame A' in which all the parts are mounted. The exact position in which the mirror Y is fixed is determined by a spring B' and adjusting screw C' while the spring D', shown in dotted lines in Fig. 5, serves to insure contact of the teeth of sector W with the threads of worm H.

In front of mirror Y is placed a tube K guided by a pivot E' received in a slot F' and intended to receive a diaphragm with cross lines, or a telescope whose optical axis should pass through the summit of the mirror Y. Another tube K' is placed within the instrument and serves as a box for the telescope or diaphragm, according as the one or the other is used in the tube K. For this purpose, the bottom cover A is provided with an aperture which corresponds with the tube K' and is closed by a hinged lid G'. At the top of the box a disk H' is screwed to the frame A', a circumferential groove being left in which a ring J is fitted to turn freely under the friction of a spring wire J'.

On the disk H' is fixed the pivot of the stop-wheel L' which has fourteen teeth and a convex segment and with which gears the single tooth pinion M' on the spindle G whereby the latter is prevented from making more than fifteen revolutions.

The mirror Y is fixed and the mirror X is movable, the latter partaking in the motion of the toothed sector W about its pivot W'. These two mirrors make to one another an angle which may be made to vary to the extent of forty-five degrees, from twenty-two degrees thirty minutes to sixty-seven degrees thirty minutes, by the rotation of the worm H which gears with the toothed sector W. It follows that the angle made by the objects sighted, when the image of the one seen by direct vision coincides with that of the other viewed by double reflection from the mirrors, may vary to the extent of ninety degrees from forty-five degrees to one hundred and thirty-five degrees since the angle made by the mirrors is half that made by the two lines of sight. The pointer J of the indicator N stands at zero of the graduated scale when the angle of the lines of sight is ninety degrees. The train of gear wheels I, L, M, N, is so proportioned that the worm H makes fifteen revolutions to one revolution of wheel N.

The rotating cover B is provided at the circumference with a graduation corresponding to $$\frac{1}{\sin (\gamma' - \gamma'')}$$

for the first revolution of the cover; for the six and a half revolutions following the graduation is transferred to six and a half spiral turns marked upon the cover. The pointer $m$ has a vernier at each side.

On the circumference of ring J there are two hundred divisions and one or more points of reference $n$ which may be marked with letters or other signs. Upon the cylindrical part of the case is engraved a line which corresponds with the pointer $m$ when the pointer $j$ of the indicator N is at the zero of the graduation.

The mode of using the instrument for determining the distance (d) Fig. 1 is as follows:—The operator being at the station P' takes the instrument between the thumb and fore-finger of the left hand so as to be able to turn the handle C with the right hand. The pointer $j$ of the indicator N being at zero, the sliding-shutter E is moved so as to unclose the sight apertures in the circumference of the casing D and the sight aperture F in the bottom A, in order that the visual rays may enter the instrument. The point P is sighted directly through the diaphragm or telescope and the disk B is rotated in the direction of motion of the hands of a watch until the signal S is also sighted in the same direction by the double reflection of the mirrors X and Y. The number (c) at which the pointer $j$ of the indicator N now stands, is then read off on the graduated circle. The operator in passing from the station P' to the station P'' measures the base $b$ which is selected of such length as to contain a whole number of tens of units of length. By dividing (b) by one hundred, multiplying the quotient by the number (c) and subtracting the product from the base (b) the first factor sought, viz. b sin $\gamma'$ is obtained. At the station P'' the operator first places the stud $q$ of the counter disk Q opposite the pointer $j$. Then by turning the ring J a point of reference $n$ is brought opposite the pointer $m$. With the instrument thus adjusted the station P is sighted and the disk B rotated in the opposite direction to the motion of the hands of a watch until the signal S is again sighted by double reflection of the mirrors X and Y. This done the number (c') on the graduation of disk B which coincides with the point of reference $n$ is read off and this number is the second factor $$\frac{1}{\sin (\gamma' - \gamma'')}$$

which only requires to be multiplied by the result of the previous operations to obtain the distance (d). The number (c') should be read upon the margin of the disk B if at the station P'' but one revolution of the handle C has been made or upon the first, second, third, or following convolutions of the spiral according as one, two, three, or more revolutions have been made, the number of said revolutions being denoted by the motion of the pointer j with regard to the stud q of the counter Q.

It will be understood that by the arrangement and graduation of the principal parts of the instrument the number (c') obtained as above described has reference to the difference between the angles comprised between 17'.6 about, and forty-five degrees, but these differences are not necessarily comprised between these limits. The factor (c') may, in fact, be obtained for differences of angles less than 17'.6 by dividing the number one thousand by the number of divisions of the ring J that the pointer m is shifted from the point of reference n, since it will be remembered that the smallest angles are proportional to their sines. In the present case, each division corresponds to $$\frac{6°}{100} = 3'.6$$

of which the sine is about 0.001. The factor (c') may be obtained for angular differences greater than forty-five degrees by arranging the instrument so as to give such angles of collimation and reading off the number a denoted by the pointer j:—

$$\text{for } c' = \frac{1}{1 - \frac{a}{100}} = \frac{100}{100 - a.}$$

The instrument has been described as applied to the determination of the distance of one point from another which is inaccessible, this being usually the case, and being the purpose for which the instrument would be most generally used. But by a careful examination of the way in which the instrument is arranged and graduated, it will be understood that it is capable of giving any angles and all the corresponding trigonometric lines, so as to fulfill various military requirements for laying down or surveying angles on the ground for measuring distances and generally for the solution of any geometrical topographical problem. Finally, it will be understood that by the simultaneous employment of two such instruments at two stations, the distance of a moving body may be ascertained, which is very important for coast-defense, forts, and for war-ships.

I claim as new and desire to secure by Letters Patent—

1. In an instrument for measuring distances, the combination of an inclined mirror Y, a second mirror X, facing the same under an angle, a telescope or diaphragm whose optical axis passes through the summit of the mirror Y, a casing containing said appliances, a rotatable cover for such casing, and means for converting the revolving motion of the cover into swinging motion of mirror X, whereby the doubly reflected image of one signal can be brought to coincide with the image of the other signal observed directly through the telescope or diaphragm, substantially as set forth.

2. In an instrument for measuring distances, the combination of inclined mirror Y, a second mirror X, telescope or diaphragm K, the surrounding cylindrical casing its rotatable cover B, worm H, pinion I, axis G, sector W gearing with the worm, toothed indicator wheel N receiving motion from wheel L and provided with pointer j, substantially as set forth.

3. In an instrument for measuring distances, the combination of inclined mirror Y, a second mirror X, telescope or diaphragm K the surrounding cylindrical casing its rotatable cover B, means for converting rotating motion of such cover into swinging motion of mirror X, wheel N in gear with a wheel on the axis G of the rotatable cover, the registering disk Q on the axis of wheel N, index stud q and pointer j, substantially as set forth.

4. In an instrument for measuring distances, the combination of inclined mirror Y, mirror X, telescope or diaphragm K, the surrounding casing, its rotatable cover B, means for converting rotating motion of such cover into swinging motion of mirror X, stop wheel L' journaled in the casing and single tooth pinion M' on axis G of cover B, substantially as set forth.

5. In an instrument for measuring distances, the combination of an inclined mirror Y, a second mirror X, telescope or diaphragm K, the surrounding cylindrical casing, its rotatable cover B carrying a pointer and scale, means for converting revolving motion of the cover into swinging motion of mirror X, ring J surrounding the movable cover and carrying one or more reference points n, substantially as set forth.

6. In an instrument for measuring distances, the combination of inclined mirror Y, second mirror X, telescope or diaphragm K, the surrounding cylindrical casing its rotatable cover B carrying on its periphery a scale corresponding to its first revolution and upon a spiral line a scale corresponding to its further revolutions, means for converting revolving motion of the cover into swinging motion of mirror X, and ring J surrounding the movable cover and carrying one or more reference points n, substantially as set forth.

Signed at Rome, in the Kingdom of Italy, this 13th day of April, 1893.

EDUARDO FALLETTI.

Witnesses:
G. B. ZANARDO,
G. B. BORTOLURRI.